United States Patent
Berringer et al.

(10) Patent No.: US 9,106,176 B2
(45) Date of Patent: Aug. 11, 2015

(54) APPARATUS FOR MOTOR CONTROL SYSTEM AND ASSOCIATED METHODS

(71) Applicant: Silicon Laboratories Inc., Austin, TX (US)

(72) Inventors: Kenneth A Berringer, Austin, TX (US); Axel Thomsen, Austin, TX (US); Pedro Pachuca, Austin, TX (US); Brent Wilson, Austin, TX (US); Jinwen Xiao, Austin, TX (US); Scott Willingham, Austin, TX (US); Kenneth W Fernald, Austin, TX (US); Paul Zavalney, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 192 days.

(21) Appl. No.: 13/731,081

(22) Filed: Dec. 30, 2012

(65) Prior Publication Data

US 2014/0184116 A1 Jul. 3, 2014

(51) Int. Cl.
H02P 6/00 (2006.01)
H02P 21/06 (2006.01)
H02P 7/00 (2006.01)

(52) U.S. Cl.
CPC ........ H02P 21/06 (2013.01); *H02P 2007/0088* (2013.01)

(58) Field of Classification Search
CPC ... H02P 6/085; H02P 6/20; H02P 2007/0088; H02P 21/06
USPC ............. 318/400.01, 400.09, 700, 727, 590, 318/594, 599, 600, 601, 504, 767, 808; 700/75, 77, 65
See application file for complete search history.

(56) References Cited

U.S. PATENT DOCUMENTS

| | | | |
|---|---|---|---|
| 4,494,051 A | 1/1985 | Bailey | |
| 5,780,983 A | 7/1998 | Shinkawa et al. | |
| 5,910,716 A | 6/1999 | Olsen et al. | |
| 6,064,175 A | 5/2000 | Lee | |
| 6,239,502 B1 * | 5/2001 | Grewe et al. | 290/1 B |
| 6,377,017 B2 * | 4/2002 | Kondou et al. | 318/727 |
| 6,528,967 B2 * | 3/2003 | Hallidy | 318/808 |
| 6,844,697 B2 * | 1/2005 | Masaki et al. | 318/721 |
| 7,002,318 B1 * | 2/2006 | Schulz et al. | 318/782 |
| 7,348,744 B2 | 3/2008 | Liao et al. | |
| 7,746,024 B2 * | 6/2010 | Rozman et al. | 318/722 |
| 8,177,222 B2 * | 5/2012 | Yaginuma | 271/152 |
| 8,253,360 B2 * | 8/2012 | Schulz et al. | 318/400.02 |
| 8,716,961 B2 | 5/2014 | Ramu | |
| 8,796,983 B2 * | 8/2014 | Wu et al. | 318/721 |
| 2003/0173850 A1 | 9/2003 | Beyer et al. | |

(Continued)

OTHER PUBLICATIONS

Padmaraja Yedamale, "AN885, Brushless DC (BLDC) Motor Fundamentals," Microchip, 2003, 20 pgs.

(Continued)

*Primary Examiner* — Rita Leykin
(74) *Attorney, Agent, or Firm* — Law Offices of Maximilian R. Peterson

(57) ABSTRACT

A motor control apparatus to control a motor external to the motor control apparatus includes a microcontroller unit (MCU). The MCU includes mixed signal motor control circuitry adapted to perform back electromotive force (EMF) motor control in a first mode of operation. The mixed signal motor control circuitry is further adapted to perform field oriented control (FOC) in a second mode of operation.

20 Claims, 9 Drawing Sheets

(56) References Cited

U.S. PATENT DOCUMENTS

2008/0018188 A1    1/2008  Reuter
2012/0206949 A1*   8/2012  Owen et al. .................. 363/127
2013/0249457 A1*   9/2013  Gallegos-Lopez
                           et al. ........................ 318/400.23

OTHER PUBLICATIONS

Green et al., "Derivation of motor line-current waveforms from the DC-link current waveforms from the DC-link of an inverter," IEE Proceedings, vol. 136, Pt. B, No. 4, Jul. 1989, 9 pgs.

"AN208, Sensorless Brushless DC Motor Reference Design," Silicon Labs, 9/06, 40 pgs.

Ward Brown, "AN885, Brushless DC Motor Control Made Easy," Microchip, 2002, 48 pgs.

"AVR32723: Sensor Field Oriented Control for Brushless DC motors with AT32UC3B0256," Atmel, 06/09, 26 pgs.

Ramesh et al., "Field Oriented Control for Space Vector Modulation based Brushless DC Motor Drive," Int'l Journal of Advanced Research in Electrical, Electronics and Instrumentation Engineering, vol. 2, Issue 9, Sep. 2013, 8 pgs.

* cited by examiner

| | Back EMF using ADC | Back EMF using Comparators | FOC using PWM and Three Sense Resistors | FOC using PWM and Two Sense Resistors | FOC using DSVM and a Single Sense Resistor |
|---|---|---|---|---|---|
| amuxpsel | L (EMF) | L (EMF) | H (FOC) | H (FOC) | H (FOC) |
| amuxnsel | L (EMF) | L (EMF) | H (FOC) | H (FOC) | H (FOC) |
| cmuxpsel | L (EMF) | L (EMF) | H (FOC) | H (FOC) | H (FOC) |
| cmusnsel | L (EMF) | L (EMF) | H (FOC) | H (FOC) | H (FOC) |
| adctrigsel | H (CPWM) | H (CPWM) | H (CPWM) | H (CPWM) | L (DSVM) |
| pwmsel | H (CPWM) | H (CPWM) | H (CPWM) | H (CPWM) | L (DSVM) |
| CPWM | enabled | enabled | enabled | enabled | disabled |
| DSVM | disabled | disabled | disabled | disabled | enabled |
| PGA0 | IDC | IDC | IA | IA | IDC |
| PGA1 | disabled | disabled | IB | IB | disabled |
| PGA2 | disabled | disabled | IC | disabled | disabled |
| ADC ch0 | VA-VY | VA-VY | PGA0 (IA) | PGA0 (IA) | PGA0 (IA) |
| ADC ch1 | VB-VY | VB-VY | PGA0 (IB) | PGA0 (IB) | disabled |
| ADC ch2 | VC-VY | VC-VY | PGA0 (IC) | disabled | disabled |
| ADC ch3 | PGA0 (IDC) | PGA0 (IDC) | VM | VM | VM |
| COMP0 | disabled | VA-VY | PGA0 (IA) | PGA0 (IA) | PGA0 (IA) |
| COMP1 | disabled | VB-VY | PGA0 (IB) | PGA0 (IB) | disabled |
| COMP2 | disabled | VC-VY | PGA0 (IC) | disabled | disabled |
| COMP3 | PGA0 (IDC) | PGA0 (IDC) | VM | VM | VM |

Fig. 5

APPARATUS FOR MOTOR CONTROL SYSTEM AND ASSOCIATED METHODS

TECHNICAL FIELD

The disclosures relates generally to motor control apparatus and, more particularly, to apparatus for a motor control system using a microcontroller unit (MCU), and associated methods.

BACKGROUND

Since their inception, electric motors have become more commonly used blocks in electrical, electronic, and electromechanical systems. Over time, different types of motors have been invented. Some motors have more specialized uses, while other motors, for example, the AC induction motor, have relatively widespread use in many areas.

The applications of electric motors have also evolved over time. Consequently, electric motors are now used in many areas of scientific, consumer, industrial, and medical products. Although in some applications, for example, a typical consumer-grade cooling fan, the electric motor is powered on or off, other applications entail more sophisticated control of motors. For example, the speed, torque, direction of rotation, and perhaps other attributes of motors are controlled in various applications.

To provide the capability to control various attributes of motors, motor controllers have been developed. The motor controllers usually include an electronic circuit that is used together with a power semiconductor drive circuit, such as an inverter. Different motor controllers can control different motors, such as alternating current (AC) motors or direct current (DC) motors, using techniques such as back electromotive force (back EMF) control, and field oriented control (FOC), direct space vector modulation (DSVM), pulse width modulation (PWM), etc., as persons of ordinary skill in the art understand.

SUMMARY

A variety of motor control apparatus and related techniques are disclosed and contemplated. In one exemplary embodiment, a motor control apparatus to control a motor external to the motor control apparatus includes an MCU. The MCU includes mixed signal motor control circuitry adapted to perform back EMF motor control in a first mode of operation. The mixed signal motor control circuitry is further adapted to perform field oriented control in a second mode of operation.

According to another exemplary embodiment, a motor control system includes a motor, and an inverter coupled to the motor to supply power to the motor. The motor control system further includes a single MCU. The MCU includes a mixed signal motor control circuit adapted to operate in first and second modes of operation. In the first mode of operation the mixed signal motor control circuit provides a first set of control signals to the inverter to control the motor using back EMF control. In the second mode of operation the mixed signal motor control circuit provides a second set of control signals to the inverter to control the motor using field oriented control.

According to another exemplary embodiment, a method of controlling an electric motor, using an MCU having first and second modes of operation, includes selecting the first mode of operation or the second mode of operation. The method further includes configuring the MCU to operate in either the first mode of operation to control the motor using back EMF control, or in the second mode of operation to control the motor using field oriented control. The method further includes operating the MCU in the selected one of the first and second modes of operation to generate a set of motor control signal, and providing the set of motor control signals to an inverter adapted to control the motor.

BRIEF DESCRIPTION OF THE DRAWINGS

The appended drawings illustrate only exemplary embodiments and therefore should not be considered as limiting its scope. Persons of ordinary skill in the art appreciate that the disclosed concepts lend themselves to other equally effective embodiments. In the drawings, the same numeral designators used in more than one drawing denote the same, similar, or equivalent functionality, components, or blocks.

FIG. 5 illustrates various signals and associated values used to implement different types of motor control schemes according to an exemplary embodiment.

DETAILED DESCRIPTION

The disclosure relates generally to motor control apparatus and related techniques. More specifically, the disclosure relates to apparatus for a motor control system using an MCU, and associated methods. Motor control systems according to various embodiments provide a flexible, yet powerful, technique for controlling more than one type of motor, as described below in detail.

According to various embodiments, a motor control system may be used that supports both back EMF control and field oriented control. More specifically, in various embodiments, a motor control system uses an MCU that can support both back EMF control of a brushless DC (BLDC) motor, and field oriented control of a permanent magnet synchronous motor or AC induction motor.

The control scheme may be flexibly programmed by the user of the motor control system. A variety of motors may be controlled using a single integrated MCU that includes mixed signal motor control circuitry. For example, in one application, the motor control circuitry may be programmed to control a BLDC motor in one mode of operation. In another application, the motor control circuitry may be programmed to control a permanent magnet synchronous motor or AC induction motor in another mode of operation.

Conventional motor controllers address either sensorless control or field oriented control, but not both. Motor control systems according to various embodiments, however, provide the resources and flexibility to support both of these types of motor control in a single integrated MCU. The system supports back EMF control, using either an analog to digital converter (ADC) or comparators, in one mode of operation. It also supports field oriented control, using three, two, or one current sense resistors, in another mode of operation.

Figure 1:
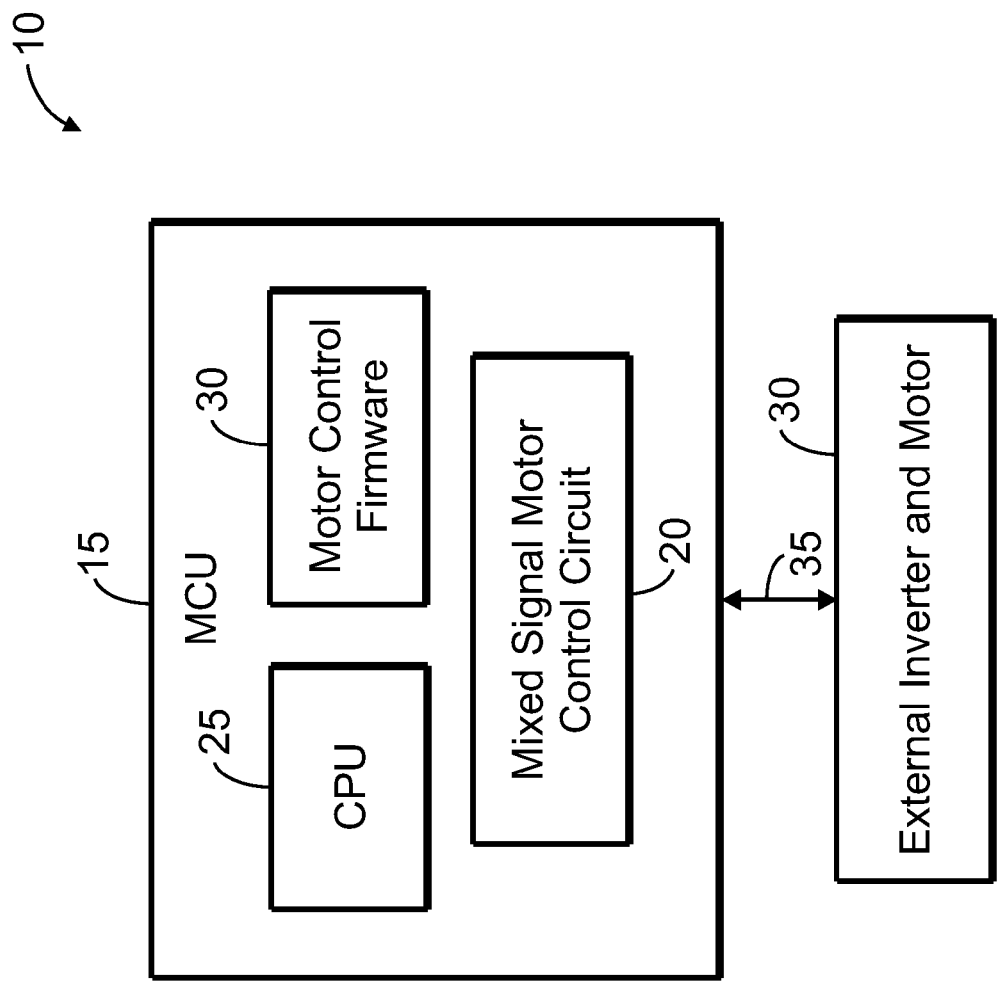
FIG. 1 illustrates a block diagram of a motor control system according to an exemplary embodiment.

FIG. 1 illustrates a block diagram of a motor control system according to an exemplary embodiment. The motor control system includes an MCU 15, coupled to an external inverter and motor combination 30 via link 35. The external inverter and motor combination 30 may include an inverter or other suitable circuitry to supply power or drive signals to a motor.

In exemplary embodiments, the motor may be a BLDC, a permanent magnet synchronous motor, or an AC induction motor. As noted above, MCU 15 has multiple modes of operation, which allow support of the above types of motor.

MCU 15 provides control signals to external inverter and motor combination 30 via link 35, as described below in detail. Furthermore, via link 35, external inverter and motor combination 30 may provide various data or information, for example, current signals or levels, to MCU 15, for instance, to mixed signal motor control circuit 20.

In exemplary embodiments, link 35 may include one or more coupling mechanisms. The coupling mechanisms may include a variety of types of conductor, cable, printed circuit board (PCB) traces, etc. Generally, the type, number, and arrangement of the coupling mechanisms depends on the design and performance specifications for a given motor control system implementation, as persons of ordinary skill in the art understand.

In the embodiment shown, MCU 15 includes mixed signal motor control circuit 20, central processing unit (CPU) 25, and motor control firmware circuit 30. CPU 25 performs general control of MCU 15, and may also provide a variety of data or information processing capabilities, as persons of ordinary skill in the art understand.

Without limitation, CPU 25 may perform general programmable logic, arithmetic, control, and/or other tasks. CPU 25 may also perform various tasks related to motor control, as described below in detail. In particular, motor control firmware circuit 30 may include instructions or information that facilitates the performance of various tasks related to motor control by CPU 25.

In exemplary embodiments, motor control firmware circuit 30 may include a non-volatile memory (NVM), such as electrically programmable read only memory (EPROM), flash memory, and the like. Motor control firmware circuit 30 may be programmed in variety of ways, as persons of ordinary skill in the art understand, for example, by using links (not shown) that interface with circuitry external to MCU 15.

By programming motor control firmware circuit 30, the system may be customized to perform a variety of motor control algorithms or techniques, the various parameters related to motor control may be modified, fine-tuned, updated, etc., as persons of ordinary skill in the art understand. In this manner, the motor control system provides a flexible platform for controlling several types of motor.

Note that motor control firmware circuit 30 may be omitted in some embodiments, and its function implemented in hardware and/or combination of hardware or software, as desired. For example, if the flexibility of using firmware is not desired (or more flexibility is desired, for example, by using software), some or all of the functionality prescribed by the firmware may be implemented using hardware. The details of such hardware circuits depend on a particular implementation, as persons of ordinary skill in the art understand.

In exemplary embodiments, mixed signal motor control circuit 20 operates in conjunction with CPU 25 and motor control firmware circuit 30 to control the motor (not shown explicitly), as described below in detail. Through link 35, mixed signal motor control circuit 20 (or MCU 15, generally) may provide control signals, data signals, or other types of information to external inverter and motor 30, and receive data signals, status signals, or other types of information from external inverter and motor 30, as described below in detail.

Note that FIG. 1 illustrates a simplified block diagram of MCU 15. MCU 15 may include a variety of other circuits to provide desired features or functionality. Without loss of generality and limitation, MCU 15 may include one or more of other circuitry, such as a power-on reset (POR) circuit, power management unit (PMU), host interface circuitry, brownout detector, watchdog timer, and the like. In some embodiments, one or more of the above circuits may be included in MCU 15, as desired.

Furthermore, rather than using an MCU, one may use other types of circuits and/or firmware or software to implement motor control systems according to various embodiments. For example, one may use microprocessors, finite state machines, programmable logic (e.g., field programmable gate arrays), and the like, by making appropriate modifications to the circuitry shown in FIG. 1. The choice of circuitry and associated firmware/software depends on factors such as design and performance specifications for a given motor control system implementation, available technology, cost, etc., as persons of ordinary skill in the art understand.

Figure 2:
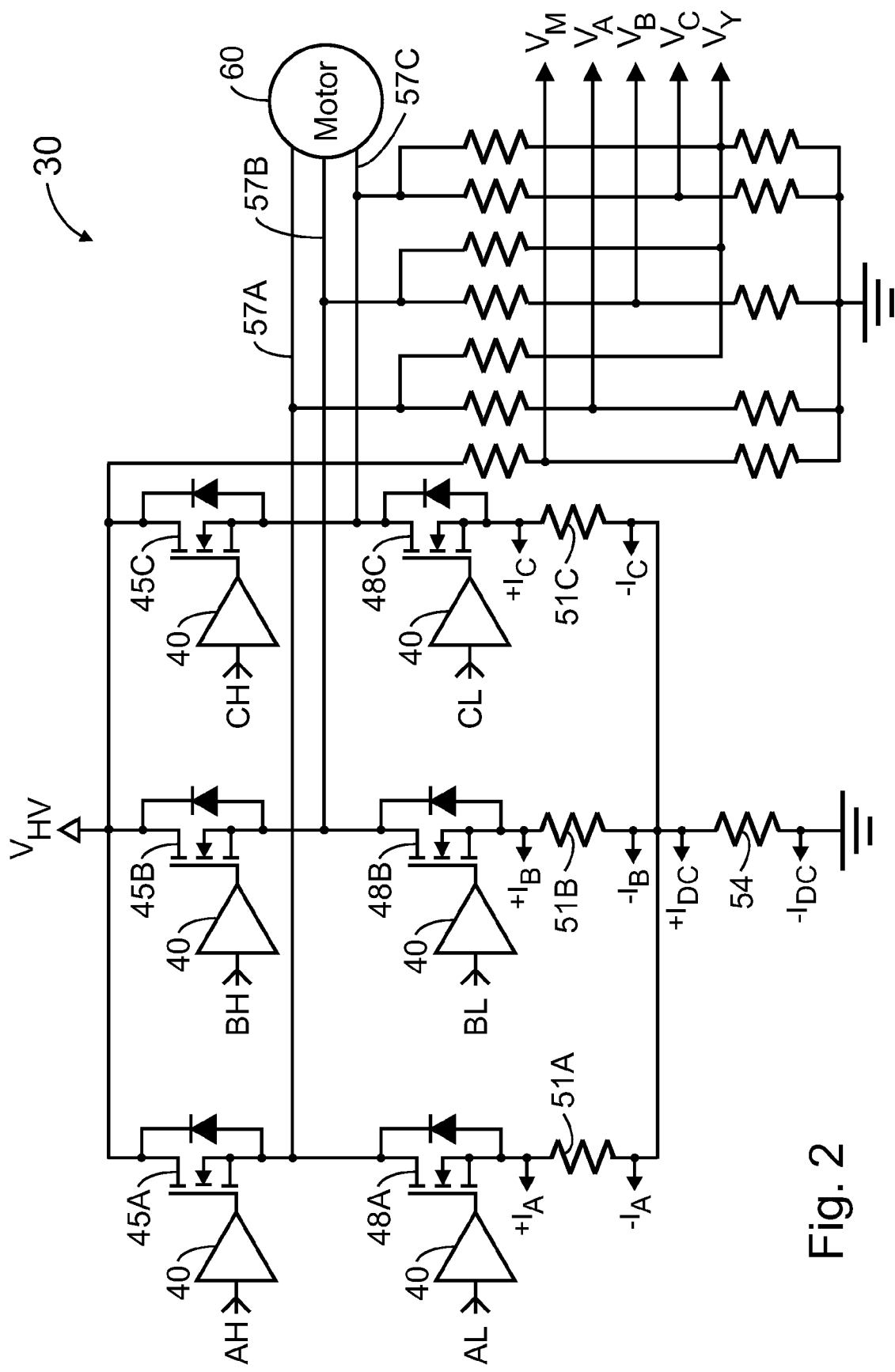
FIG. 2 depicts a circuit arrangement for controlling motors according to an exemplary embodiment.

FIG. 2 depicts a circuit arrangement for controlling motors according to an exemplary embodiment. More specifically, FIG. 2 shows a block diagram of external inverter and motor 30.

Generally, FIG. 2 shows a three phase inverter coupled to a motor 60. In addition, FIG. 2 shows a set of resistor dividers to scale various voltages related to the inverter/and or motor 60, as described below in detail. Furthermore, FIG. 2 shows current sensing resistors 51A-51C and 54, as described below in detail.

In the embodiment shown, the inverter is a three phase inverter and drives a three phase motor 60. As persons of ordinary skill in the art understand, however, other arrangements are possible, and contemplated, and may be implemented by making appropriate modifications.

For example, in some embodiments, the inverter may be a single phase inverter and may drive a single phase motor. In such a situation, two of the three inverter legs shown in FIG. 2 are used to drive the single phase motor. In some embodiments using this approach, the motor may be a brushed DC motor. Generally, the topology of the inverter and type of motor depend on the design and performance specifications for a given motor control system implementation, as persons of ordinary skill in the art understand.

Referring to the exemplary embodiment shown in FIG. 2, the inverter includes three legs or circuit branches. Each leg includes an upper transistor, and a lower transistor. FIG. 2 includes upper transistors 45A-45C and lower transistors 48A-48C, which correspond to the three phases, respectively.

Transistors 45A-45C and 48A-48C act as switches to provide power from a link or supply, with a voltage $V_{HV}$, to motor 60, in a manner known to persons of ordinary skill in the art. Note that, although FIG. 2 shows power metal oxide semiconductor field effect transistors (MOSFETs), other types of switch or device may be used, as persons of ordinary skill in the art understand.

Without limitation, bipolar junction transistors (BJTs), insulated gate bipolar transistors (IGBTs), etc., may be used, as desired. The choice of switch or device selection depends on a variety of factors, such as power and/or voltage level, size of motor 60, switching frequency of the devices, cost, available technology, etc., as persons of ordinary skill in the art understand.

A set of buffers or drivers 40 drive upper transistors 45A-45C and lower transistors 48A-48C. Drivers 40 may provide appropriate drive signals to cause the switching of upper transistors 45A-45C (n-channel MOSFETs in the embodiment shown) and lower transistors 48A-48C (n-channel MOSFETs in the embodiment shown) in response to control signals from MCU 15. Note that, in some embodiments, upper transistors 45A-45C may be p-channel MOSFETs, depending on factors such as voltage an power levels, as persons of ordinary skill in the art understand.

More specifically, a set of control signals AH-CH serve as input signals to drivers 40 for upper transistors 45A-45C, respectively. Another set of control signals, AL-CL, serve as input signals to drivers 40 for lower transistors 48A-48C, respectively. By controlling signals AH-CH and AL-CL, MCU 15 may control upper transistors 45A-45C and lower transistors 48A-48C, thus controlling the supply of power to the corresponding phases of motor 60.

More specifically, node 57A of upper transistor 45A and lower transistor 48A drives the first phase of motor 60. Node 57B of upper transistor 45B and lower transistor 48B drives the second phase of motor 60. Finally, node 57C of upper transistor 45C and lower transistor 48C drives the third phase of motor 60.

A set of current sense resistors, 51A-51C, sense the current flowing in each leg or branch of the inverter, by generating a set of voltages that are supplied to MCU 15. More specifically, resistor 51A senses the current flowing in the first branch of the inverter, giving rise to voltages $+I_A$ and $-I_A$. The difference between voltages $+I_A$ and $-I_A$ is proportional to the current through the first branch of the inverter. Thus, resistor 51A provides a differential signal to MCU 15 that is proportional to and indicates the level of current in the first branch of the inverter.

Similarly, resistor 51B senses the current flowing in the second branch of the inverter, giving rise to voltages $+I_B$ and $-I_B$, which is provided to MCU 15 as a differential signal. Finally, resistor 51C senses the current flowing in the third branch of the inverter, giving rise to voltages $+I_C$ and $-I_C$, which is provided to MCU 15 as a differential signal.

Note that in some embodiments, the current may be sensed by using two sense resistors, for example, 51A-51B. In this situation, voltages $+I_A$ and $-I_A$ and $+I_B$ and $-I_B$ are provided to MCU 15 as differential signals. In other embodiments, current may be sensed by one resistor.

Specifically, resistor 54 may be used to sense the current flowing through the branches of the inverter (more specifically, through lower transistors 48A-48C), to develop voltages $+I_{DC}$ and $-I_{DC}$. Voltages $+I_{DC}$ and $-I_{DC}$ may be provided to MCU 15 as a differential signal.

As noted, in some embodiments, some of the current sense resistors might not be used. In such situations, the unused resistors may be replaced with short circuits (e.g., a length of wire, PCB trace, etc.) to decrease or eliminate the power that would otherwise be dissipated in the unused sense resistor(s).

As noted, a set of resistor dividers are used to scale various voltages in the circuit shown in FIG. 2. The resistor dividers scale the motor or link voltages down to levels that are safe, compatible, or comparable to the supply and/or input voltages of MCU 15.

Thus, resistor dividers scale the three phase voltages and provide the resulting scaled phase voltages as $V_A$, $V_B$, and $V_C$, respectively. Similarly, a resistor divider is used to scale the supply or link voltage, $V_{HV}$, down to a voltage $V_M$. An additional resistor divider provides a scaled virtual Y sum of the three phase voltages as V.

Note that, depending on the mode of operation (e.g., back EMF versus FOC), some of the resistor dividers may not be used. For example, the resistor divider that generates $V_M$ is used for field oriented control. Thus, for field oriented control, the other voltage dividers may not be used.

The various voltages from the resistor dividers (e.g., $V_A$-$V_C$, $V_M$, $V_Y$) are provided to MCU 15 via link 35. MCU 15 uses those voltages to perform back EMF or field oriented control in various modes of operation.

Note that in some embodiments, the various voltages present in the circuit in FIG. 2 (e.g., $V_A$-$V_C$, $V_Y$) may be comparable to, or safe to apply to, MCU 15. In such situations, the applicable resistor dividers may be omitted, as desired, and the corresponding voltages may be coupled to MCU 15.

Figure 3:
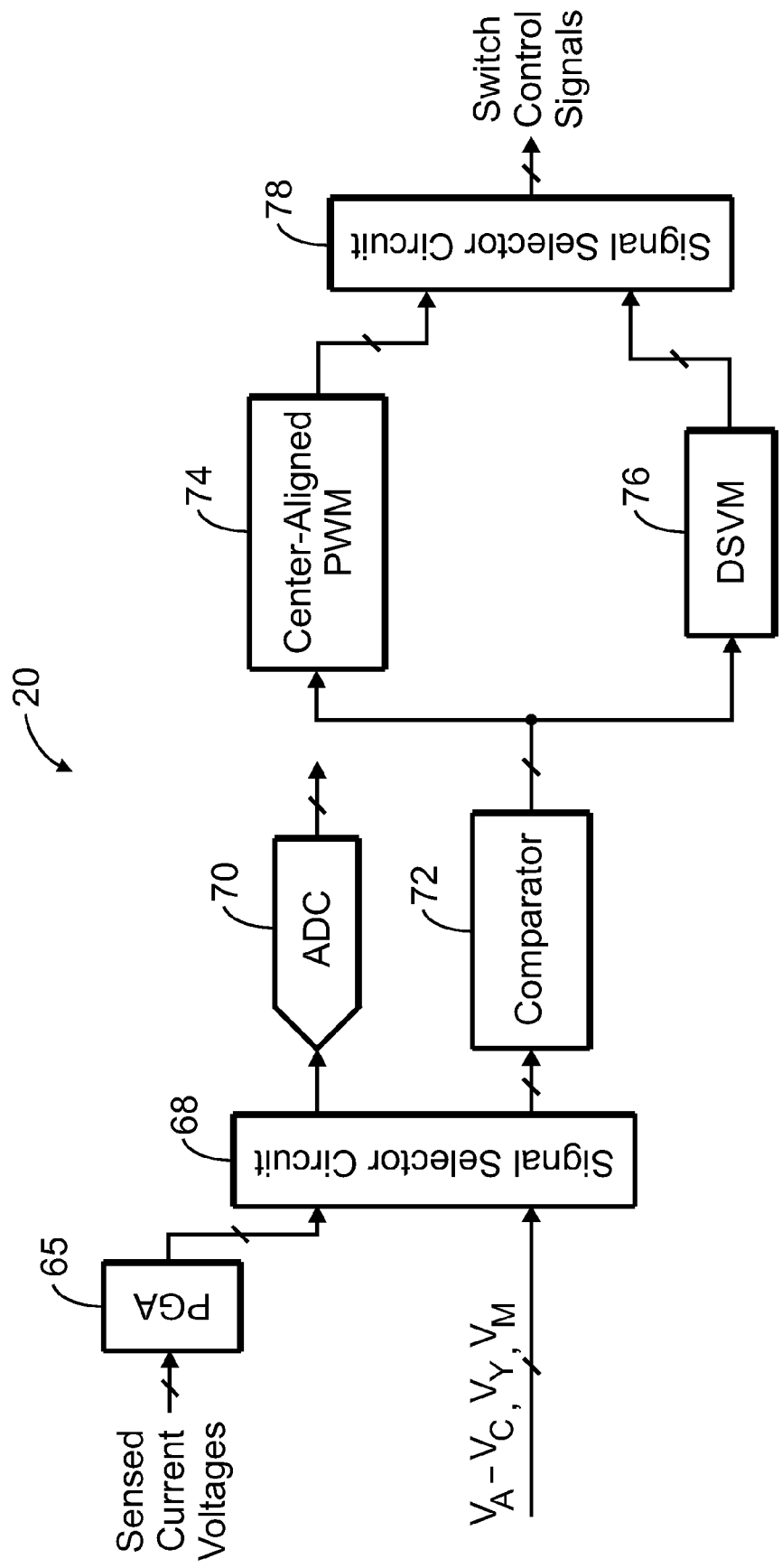
FIG. 3 shows a block diagram of a mixed signal motor control circuit according to an exemplary embodiment.

FIG. 3 shows a block diagram of a mixed signal motor control circuit 20 according to an exemplary embodiment. More specifically, FIG. 3 illustrates a block diagram of the general architecture of mixed signal motor control circuit 20 (a more detailed circuit arrangement is presented in FIG. 4).

As noted above, the circuit supports both back EMF control of a BLDC motor and field oriented control of a permanent magnet synchronous motor or an AC induction motor. When used for field oriented control, the circuit supports the use of three, two, or one sense resistor to measure the motor currents.

As noted above, mixed signal motor control circuit 20 operates in conjunction with other parts of MCU 15 (see FIG. 1). Accordingly, the blocks shown in FIG. 2 cooperate with other MCU circuitry, such as CPU 25, motor control firmware circuit 30, etc.

Referring to FIG. 2, mixed signal motor control circuit 20 includes programmable gain amplifier (PGA) 65, signal sector circuit 68, ADC 70, comparator 72, center-aligned PWM circuit 74, DSVM circuit 76, and signal selector circuit 78. Mixed signal motor control circuit 20 receives a variety of signals, such as all or a subset of $V_A$, $V_B$, $V_C$, $V_Y$, $V_M$, $+I_A$, $-I_A$, $+I_B$, $-I_B$, $+I_C$, $-I_C$, $+I_{DC}$, and $-I_{DC}$. Mixed signal motor control circuit 20 uses the input signals to generate control signals (e.g., AH-CH and AL-CL) for the inverter (not shown).

Referring to FIG. 2, mixed signal motor control circuit 20 uses PGA 65 to amplify one or more input signals, such as $+I_A$, $-I_A$, $+I_B$, $-I_B$, $+I_C$, $-I_C$, $+I_{DC}$, and $-I_{DC}$. In some embodiments, PGA 65 may use several amplifiers that correspond to the number of input signals.

Signal selector circuit 68 receives outputs of PGA 65 and other inputs to mixed signal motor control circuit 20, such as $V_A$, $V_B$, $V_C$, $V_Y$, $V_M$. Signal selector circuit 68 selectively provides the input signals to ADC 70 and comparator 72. ADC converts the signals provided to it to digital signals, which it provides to other parts of MCU 15, such as CPU 25 (not shown).

Comparator 72 compares input signals (described below in detail in connection with FIG. 4) and provides a plurality of inhibit or kill signals used to implement cycle by cycle current limiting. One or more inhibit or kill signals are provided to center-aligned PWM circuit 74 and DSVM circuit 76.

Depending on the mode of operation or type of control desired, center-aligned PWM circuit 74 performs pulse width modulation such that the centers of the control signals AH-CH and AL-CL are aligned. Similarly, depending on the mode of operation or type of control desired, DSVM circuit 76 performs discrete space vector modulation.

When used for back EMF control, the circuit supports using either comparator 72 or ADC 70 to measure the back EMF. DSVM circuit specifically addresses the single resistor current sensing. When comparator 72 is not being used for back EMF control, it may be used for a cycle-by-cycle or persistent current limit by providing inhibit or kill signals to disable or inhibit the PWM or DSVM outputs.

The output signals of center-aligned PWM circuit 74 and DSVM circuit 76 are provided to signal selector circuit 78. Depending on the mode of operation or type of control desired, signal selector circuit 78 provides as its output signals either the output signals of center-aligned PWM circuit 74 or the output signals of DSVM circuit 76.

The output signals of signal selector circuit 78 are provided to external inverter and motor 30 (see FIG. 1). More specifically, the output signals of signal selector circuit 78 constitute the drive or control signals AH-CH and AL-CL for upper transistors 45A-45C and 48A-48C, respectively (see FIG. 2).

Figure 4:
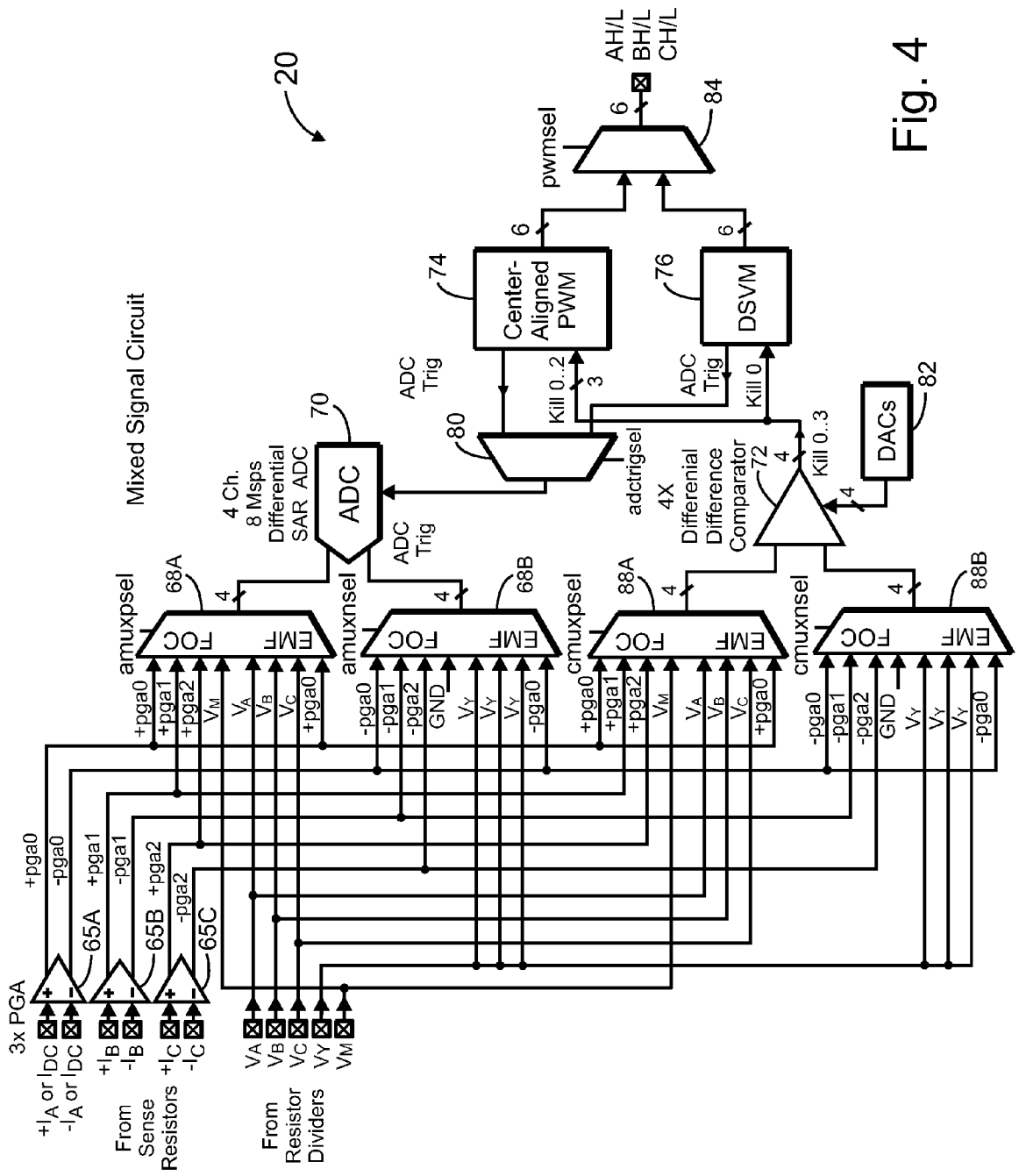
FIG. 4 depicts a more detailed block diagram of a mixed signal motor control circuit according to an exemplary embodiment.

FIG. 4 depicts a more detailed block diagram of the mixed signal motor control circuit 20 of FIG. 3. Referring to FIG. 4, the PGA includes three programmable gain amplifiers 65A-65C coupled to receive the signals from the sense resistors (see FIG. 2).

Referring back to the embodiment shown in FIG. 4, PGAs 65A-65C can provide a programmable gain from 1 to about 100. The gain programmability and range provides compatibility with a relatively wide range of motor sizes and sense resistors. As persons of ordinary skill in the art understand, however, other gain values may be used, depending on design and performance specifications for a given motor control system implementation.

In some embodiments, PGAs 65A-65C may provide level shifting of the input voltages that correspond to sensed currents. For example, the input voltages may be on the order of ±0.1 volt with respect to ground. PGAs 65A-65C may shift that level to about $\frac{1}{2}V_{DD}$, where $V_{DD}$ represents the supply voltage of mixed signal motor control circuit 20 or MCU 15. The level shifting facilitates signal processing by other circuitry in mixed signal motor control circuit 20, such as ADC 70 and/or comparator 72.

Sense resistors are readily available from as much as 1 ohm to about 200 μΩ. Control of higher current motors will generally use a sense resistor with a lower resistance value and higher power dissipation. The upper gain setting of PGAs 65A-65C will accommodate a sense resistor with a full-scale output voltage of about 10 mV. Thus, up to 100 Amperes of current may be sensed using a 1-Watt sense resistor.

Note that in some embodiments, voltage gain may be provided in ADC 70, rather than via PGAs 65A-65C. This arrangement may be used, for example, in situations where the relatively wide gain range and level shifting of PGAs 65A-65C, described above, are not desired or used. In still other embodiment, a combination of gain in PGAs 65A-65C and ADC 70, as desired.

The sense voltages from the sense resistors used for field oriented control (i.e., $+I_A$, $-I_A$, $+I_B$, $-I_B$, $+I_C$, $-I_C$) are differential bipolar (i.e., with both positive and negative swings) signals. The motor phase current is negative for 180° of an electrical cycle, and likewise the sense resistor current is negative for 180°. In exemplary embodiments, the typical differential input signal range is about ±10 mV to about ±100 mV.

The negative terminal voltages are typically at about the motor ground potential. Nevertheless, stray inductance (e.g., from wiring, PCB traces, etc.) may cause voltage spikes or swings around the ground potential (as prescribed by the familiar equation, $V_L = L\, d_i/d_t$). In exemplary embodiments, a common mode range of about ±1 V may be used to accommodate a stray inductance of about 10 nH (the value of L in the equation above) and a current switching rate of 100 Amperes per microsecond (the value of $d_i/d_t$ in the equation above).

Referring to FIG. 4, in the embodiment shown, mixed signal motor control circuit 20 includes a four-channel ADC 70. Note that in some embodiments a three channel ADC may be used to perform back EMF and field oriented control, as desired. Using four-channel ADC 70, however, allows one channel to be used for motor supply voltage sensing for the field oriented control mode of operation, or for the DC link current for the back EMF mode of operation.

Synchronizing the ADC sampling to PWM (using the "ADC trig" trigger signal shown in FIG. 4) provides relatively accurate low-noise samples. Simultaneous sampling of three or more channels enables field oriented control with minimum or reduced sampling time error, and supports relatively high PWM duty cycle. In exemplary embodiments, the sampling time is about 1 microsecond, although other values may be used in other embodiments, as persons of ordinary skill in the art understand.

ADC 70 may be implemented in a variety of ways, as persons of ordinary skill in the art understand. For example, ADC 70 might use four sample capacitors in some embodiments. As an alternatively, ADC 70 might alternate sampling between the four channels, as desired.

The embodiment shown in FIG. 4 also uses a multiplexer (MUX) 68 for use in conjunction with ADC 70. MUX 68 provides a means for switching between inputs used for field oriented control (e.g., ±pga0, ±pga1, ±pga2, which constitute outputs of PGAs 65A-65C, respectively; $V_M$, etc.) and inputs used for back EMF control (e.g., $V_A$, $V_B$, $V_C$, $V_Y$, etc.).

In the embodiment of FIG. 4, MUX 68 is implemented as a four channel 2-input multiplexer (4×2-to-1) for both positive and negative inputs, with the multiplexer sections labeled as 68A-68B, respectively. Note, however, that MUX 68 may be implemented in a variety of ways and configurations, as persons of ordinary skill in the art understand.

Regardless of implementation, MUX 68A and MUX 68B select one of their respective four inputs, and provide that input to ADC 70. FIG. 4 shows the input signals for each of MUX 68A and 68B. Signals amuxpsel and amuxnsel, provided by MCU 15 (e.g., by CPU 25) constitutes the select signals for MUX 68A and 68B, respectively.

Similarly, the embodiment shown in FIG. 4 uses a MUX 88 for use in conjunction with comparator 72. MUX 88 provides a means for switching between inputs used for field oriented control and inputs used for back EMF control.

In the embodiment of FIG. 4, MUX 88 is implemented as a four channel 2-input multiplexer (4×2-to-1) for both positive and negative inputs, with the multiplexer sections labeled as 88A-88B, respectively. Note, however, that MUX 88 may be implemented in a variety of ways and configurations, as persons of ordinary skill in the art understand.

Regardless of implementation, MUX 88A and MUX 88B select one of their respective four inputs, and provide that input to comparator 72. FIG. 4 shows the input signals for each of MUX 88A and 88B. Signals cmuxpsel and cmuxnsel, provided by MCU 15 (e.g., by CPU 25) constitutes the select signals for MUX 68A and 68B, respectively.

In the embodiment shown, comparator 72 compares four inputs received from MUX 88A with four respective inputs received from MUX 88B. Comparator 72 also has a reference input driven by DAC 82. Under control of MCU 15 (e.g., CPU 25 controlling DAC 82 and providing desired inputs to it), the reference value may be used to trim the offset value or set the current limit value. This scheme is equivalent to first converting the differential signal to a single ended signal and then comparing to a preset DAC value.

The outputs of comparator 72 are used to kill or inhibit or disable the PWM signals when implementing a cycle-be-cycle current limit. Comparator 72 may also trigger an interrupt (e.g., to CPU 25) or trigger a timer capture for back EMF control, as desired.

As noted, mixed signal motor control circuit 20 includes center-aligned PWM circuit 74, and DSVM circuit 76. Center-aligned PWM circuit 74 may be a conventional PWM block for most motor control applications. DSVM circuit 76 may be a dedicated DSVM block for field oriented control using a single sense resistor.

Center-aligned PWM circuit 74 and DSVM circuit 76 may control or synchronize the operation of ADC 70 via an ADC trigger signal. Each of center-aligned PWM circuit 74 and DSVM circuit 76 provides an ADC trigger signal to MUX 80 as input signals. In response to select signal adctrigsel, provided by MCU 15 (e.g., by CPU 25), MUX 80 provides one of its inputs to ADC 70 as a trigger signal, labeled as "ADC trig" in FIG. 4.

The outputs of center-aligned PWM circuit 74, and DSVM circuit 76 are provided as the respective inputs of MUX 84. In response to a select signal, pwmsel, provided by MCU 15 (e.g., by CPU 25), MUX 84 provides a set of six control signals (or four for a single phase implementation) to external inverter and motor 30 (see FIG. 1). In the exemplary embodiment shown in FIG. 4, the signals constitute control or drive signals AH-CH and AL-CL, described above.

By using the configuration shown in FIG. 4, MCU 15, for example, CPU 25 operating in conjunction with control firmware circuit 30, may provide various signals to control the operation of mixed signal motor control circuit 20. The signals depend on the mode of operation, i.e., back EMF versus field oriented control.

FIG. 5 illustrates in tabular form various signals and associated values used to implement or realize different types of motor control schemes according to an exemplary embodiment. More specifically, FIG. 5 shows as table columns the various types of motor control, e.g., back EMF using ADC, back EMF using comparators, field oriented control using PWM and three or two sense resistors, and field oriented control using DSVM and a sense resistor. The table rows list the names of various signals or parameters used in the motor control schemes. The table cells show the status or value of the various signals or parameters for the different types of motor control scheme.

Figure 6B:
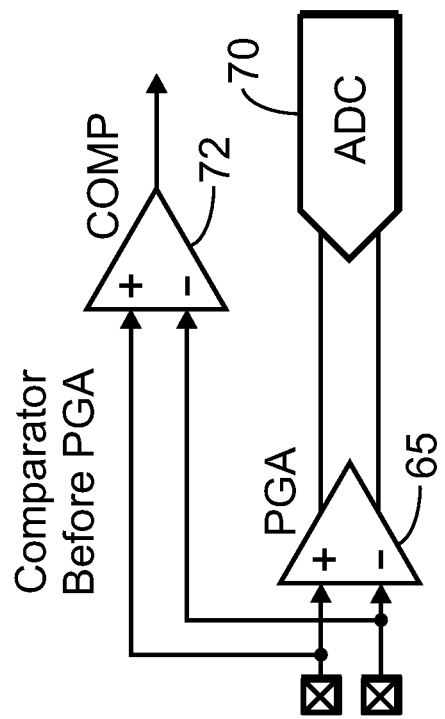
FIGS. 6A and 6B show a partial block diagram of mixed signal motor control circuits according to exemplary embodiments.
Figure 6A:
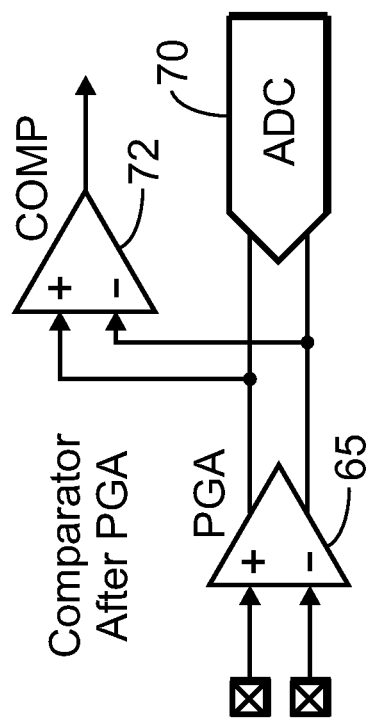

Referring back to FIG. 4, PGA 65 receives input signals and feeds the inputs of comparator 72, as described above. FIG. 6A shows a simplified block diagram showing that arrangement. Note that FIG. 6A omits MUX 68 and MUX 88 to facilitate presentation.

In some embodiments, some of the blocks may be rearranged. More specifically, in some embodiments, comparator 72 may be coupled before PGA 65 (i.e., the three PGAs 65A-65C). FIG. 6B illustrates such an arrangement. (Note that FIG. 6B also omits MUX 68 and MUX 88 to facilitate presentation, although the MUXs may be used, as desired, for a given implementation.) In this arrangement, the input signals feed the input of comparator 72 and also PGA 65. In other words, comparator 72 is arranged or coupled before PGA 65.

Referring to FIG. 6B, voltages from the sense resistors feed inputs of comparator 72. The circuit arrangement in FIG. 6B thus decouples the bandwidths of comparator 72 and ADC 70. In some embodiments, comparator 72 may have a high enough bandwidth or speed to detect or respond to over-current situations that are expected to be encountered during operation of mixed signal motor control circuit 20. The bandwidth of the ADC 70 may be reduced in order to provide increased signal to noise ratio and higher precision.

Figure 7:
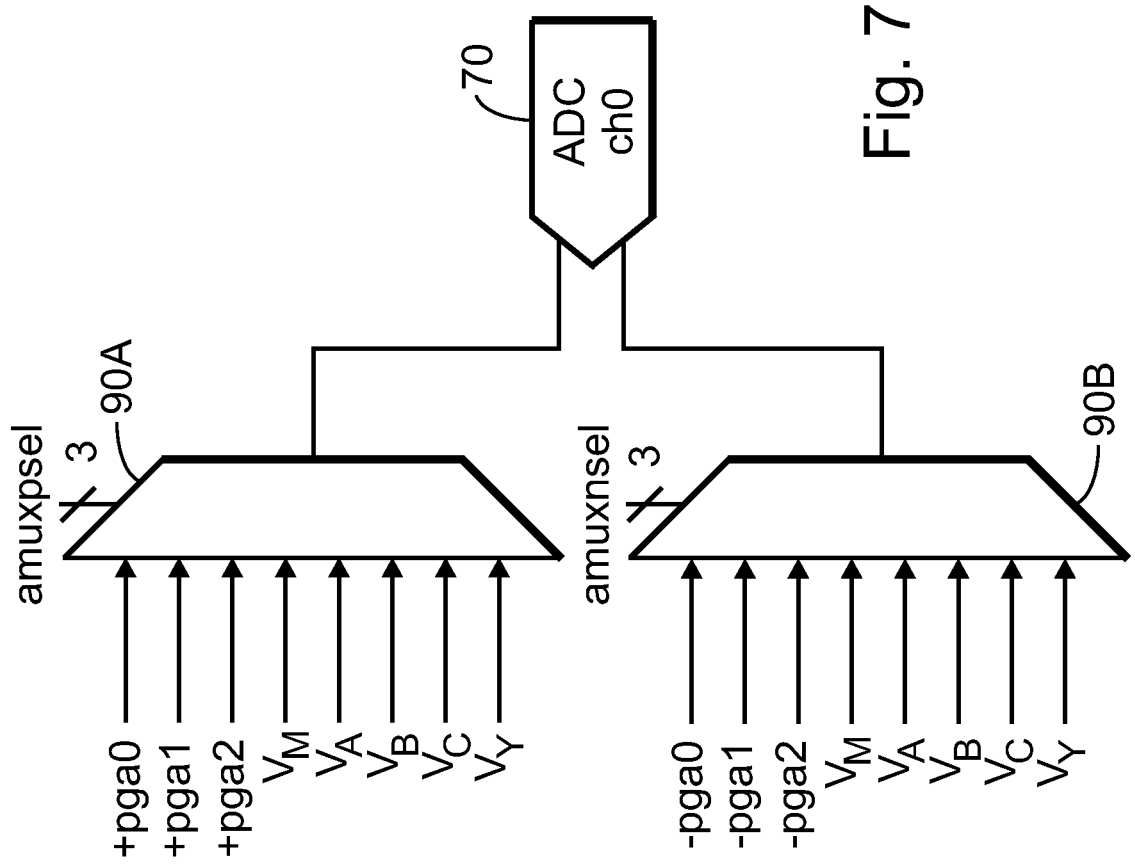
FIG. 7 depicts a circuit arrangement for extended or flexible multiplexing arrangements according to an exemplary embodiment.

In some embodiments, different MUX arrangements may be used. Specifically, FIG. 4 illustrates a four channel, two input MUX for ADC 70 and comparator 72 positive and negative inputs. An extended or flexible multiplexer for each ADC channel or comparator input set provides the capability to measure any current or voltage on any channel. FIG. 7 shows such a multiplexing circuit arrangement, using MUX 90 (consisting of MUX 90A and MUX 90B) for channel 0 of ADC 70. The multiplexing circuit arrangement shown in FIG. 7 is repeated for each ADC channel and comparator input set.

The circuit arrangement in FIG. 7 allows differential measurements or comparisons of any phase voltage to any other phase voltage (e.g., $V_A$-$V_B$, $V_B$-$V_C$, $V_C$-$V_A$). Note that not all combinations of positive and negative inputs are necessarily useful. The first three positive MUX selections should be used with the corresponding negative MUX selections. (Selecting the same voltage for positive and negative inputs would normally not provide useful information.)

According to another aspect, motor control systems according to exemplary embodiments may provide support for blanking. Specifically, when switching the switches or transistors (see FIG. 2) on the active edge of the low PWM/DSVM signals, normally a relatively large current spike may occur due to diode recovery and switching capacitances. In some embodiments, the over-current protection is not active for a relatively short duration after the active edge of the lower switching or control signal to provide a blanking period. In some embodiments, the blanking period is programmable.

Figure 8:
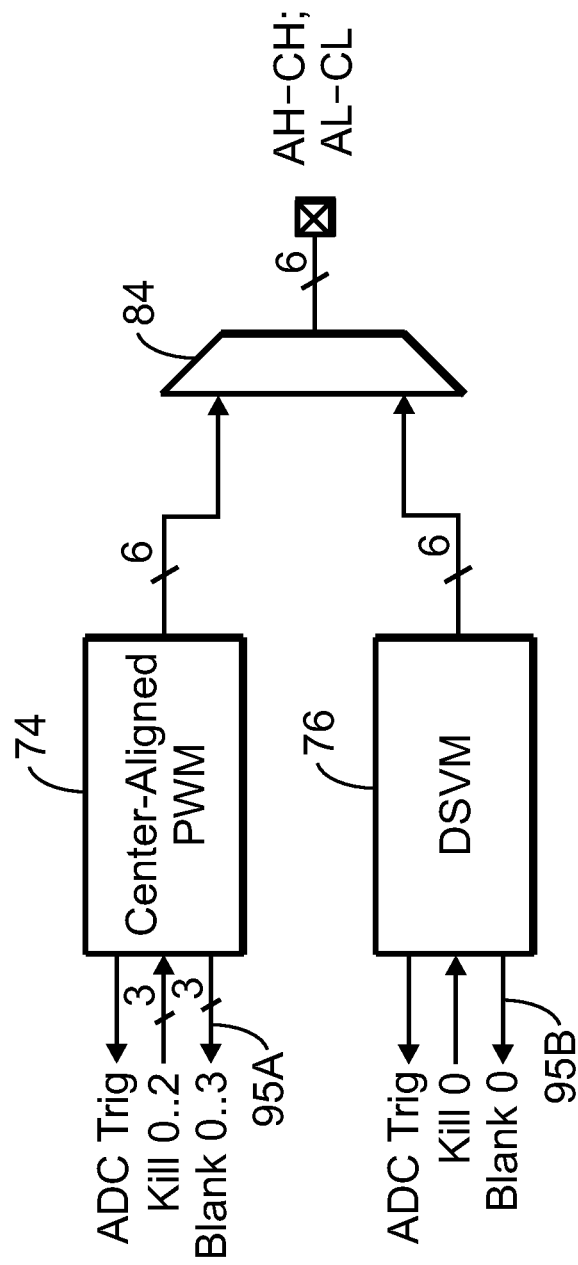
FIG. 8 illustrates a circuit arrangement to provide blanking time support according to an exemplary embodiment.

In some embodiments, the blanking time (which may be programmable) is implemented in both center aligned PWM circuit 74 and DSVM circuit 76. FIG. 8 shows a circuit arrangement to provide that capability. Center aligned PWM circuit 74 and DSVM circuit 76 generate blanking signals that are labeled 95A and 95B, respectively. Center aligned PWM circuit 74 and DSVM circuit 76 have the ability in some embodiments to ignore the kill or inhibit signal during the blanking time.

Figure 9:
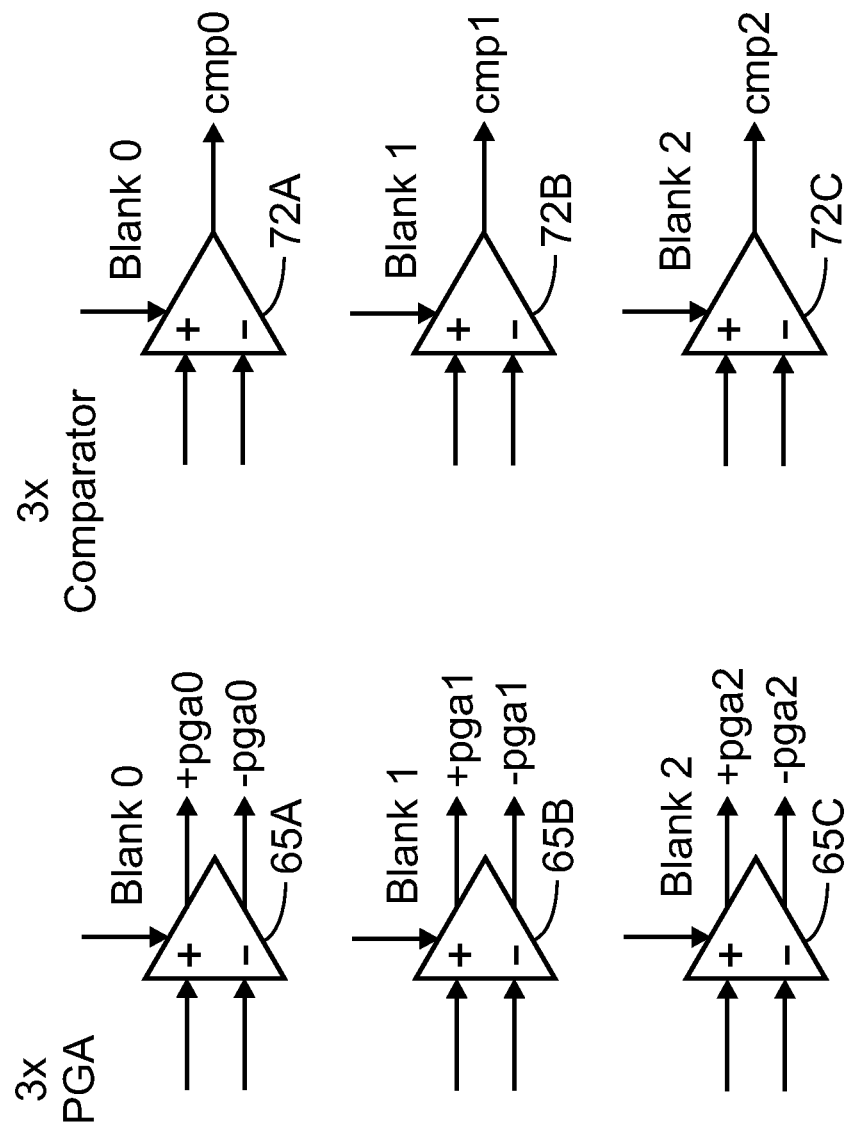
FIG. 9 shows a circuit arrangement for using blanking time signals according to an exemplary embodiment.

In addition, in some embodiments, the blanking signal is used to deactivate the front end circuitry of the PGA and comparators. FIG. 9 shows a circuit arrangement according to an exemplary embodiment that provides this feature. More specifically, blanking signals (labeled as "blank 0," "blank 1," etc.) are provided to PGAs 65A-65C and to comparators 72A-72C. By configuring PGAs 65A-65C and comparators 72A-72C into auto-zero mode (part of the calibration of PGAs 65A-65C and comparators 72A-72C in exemplary embodiments) during the blanking time, the large scale current spike is not propagated through the gain stages. This scheme protects the gain stage from overload, and also provides a relatively fast recovery time after the current spike.

Referring to the figures, persons of ordinary skill in the art will note that the various blocks shown might depict mainly the conceptual functions and signal flow. The actual circuit implementation might or might not contain separately identifiable hardware for the various functional blocks and might or might not use the particular circuitry shown. For example, one may combine the functionality of various blocks into one circuit block, as desired.

Furthermore, one may realize the functionality of a single block in several circuit blocks, as desired. The choice of circuit implementation depends on various factors, such as particular design and performance specifications for a given implementation. Other modifications and alternative embodiments in addition to those described here will be apparent to persons of ordinary skill in the art. Accordingly, this description teaches those skilled in the art the manner of carrying out the disclosed concepts, and is to be construed as illustrative only.

The forms and embodiments shown and described should be taken as illustrative embodiments. Persons skilled in the art may make various changes in the shape, size and arrangement of parts without departing from the scope of the disclosed concepts in this document.

For example, persons skilled in the art may substitute equivalent elements for the elements illustrated and described here. Moreover, persons skilled in the art may use certain features of the disclosed concepts independently of the use of other features, without departing from the scope of the disclosed concepts.

The invention claimed is:

1. A motor control apparatus to control a motor external to the motor control apparatus, the motor control apparatus comprising a microcontroller unit (MCU), the MCU comprising mixed signal motor control circuitry adapted to perform back electromotive force (EMF) motor control in a first mode of operation, the mixed signal motor control circuitry further adapted to perform field oriented control (FOC) in a second mode of operation.

2. The motor control apparatus according to claim 1, further adapted to perform back electromotive force (EMF) motor control in the first mode of operation to provide a set of signals adapted to control a brushless direct current (DC) motor.

3. The motor control apparatus according to claim 1, further adapted to perform field oriented control in the second mode of operation to provide a set of signals adapted to control a permanent magnet synchronous motor.

4. The motor control apparatus according to claim 1, further adapted to perform field oriented control in the second mode of operation to provide a set of signals adapted to control an alternating current (AC) induction motor.

5. The motor control apparatus according to claim 1, further adapted to perform field oriented control in the second mode of operation using a pulse width modulation (PWM) circuit.

6. The motor control apparatus according to claim 5, wherein the pulse width modulation (PWM) circuit is adapted to perform center aligned PWM control.

7. The motor control apparatus according to claim 1, further adapted to perform field oriented control in the second mode of operation using a direct state vector modulation (DSVM) circuit.

8. The motor control apparatus according to claim 1, further adapted to perform back electromotive force (EMF) motor control in the first mode of operation using an analog to digital converter (ADC) circuit.

9. The motor control apparatus according to claim 1, further adapted to perform back electromotive force (EMF) motor control in the first mode of operation using a comparator circuit.

10. The motor control apparatus according to claim 1, further comprising a current limit circuit adapted to provide cycle by cycle current limiting.

11. A motor control system, comprising:
a motor;
an inverter coupled to the motor to supply power to the motor; and
a single integrated microcontroller unit (MCU), the MCU comprising:
a mixed signal motor control circuit adapted to operate in first and second modes of operation, wherein in the first mode of operation the mixed signal motor control circuit provides a first set of control signals to the inverter to control the motor using back electromotive force (EMF) control, and wherein in the second mode of operation the mixed signal motor control circuit provides a second set of control signals to the inverter to control the motor using field oriented control (FOC).

12. The motor control system according to claim 11, wherein the mixed signal motor control circuit comprises a programmable gain amplifier circuit adapted to amplify a set of signals corresponding to motor currents to generate a set of amplified signals.

13. The motor control system according to claim 12, wherein the mixed signal motor control circuit further comprises an analog to digital converter (ADC) coupled to the programmable gain amplifier circuit.

14. The motor control system according to claim 13, wherein the mixed signal motor control circuit further comprises a comparator coupled to the programmable gain amplifier circuit.

15. The motor control system according to claim 11, wherein the MCU further comprises a central processing unit coupled to the ADC.

16. The motor control system according to claim 11, wherein the mixed signal motor control circuit further comprises a direct space vector modulation (DSVM) circuit to generate the second set of control signals.

17. The motor control system according to claim 11, wherein the mixed signal motor control circuit further comprises a pulse width modulation (PWM) circuit to generate the second set of control signals.

18. A method of controlling an electric motor, using a microcontroller unit (MCU) having first and second modes of operation, the method comprising:
selecting the first mode of operation or the second mode of operation of the MCU;
configuring the MCU to operate in either the first mode of operation to control the motor using back electromotive force (EMF) control, or in the second mode of operation to control the motor using field oriented control (FOC);
operating the MCU in the selected one of the first and second modes of operation to generate a set of motor control signals; and
providing the set of motor control signals to an inverter adapted to control the motor.

19. The method according to claim 18, wherein operating the MCU in the selected one of the first and second modes of operation to generate a set of motor control signals further comprises performing direct space vector modulation (DSVM).

20. The method according to claim 18, wherein operating the MCU in the selected one of the first and second modes of operation to generate a set of motor control signals further comprises performing pulse width modulation (PWM).

* * * * *